United States Patent
Biener et al.

(10) Patent No.: US 10,929,192 B2
(45) Date of Patent: *Feb. 23, 2021

(54) SELF-ADJUSTING RESOURCE PROVISIONING IN A MANAGED INFORMATION-TECHNOLOGY ENVIRONMENT

(71) Applicant: International Business Machines Corporation, Armonk, NY (US)

(72) Inventors: Adam S. Biener, Endicott, NY (US); Andrea C. Martinez, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 93 days.

This patent is subject to a terminal disclaimer.

(21) Appl. No.: 16/292,504

(22) Filed: Mar. 5, 2019

(65) Prior Publication Data
US 2019/0196877 A1    Jun. 27, 2019

Related U.S. Application Data

(63) Continuation of application No. 15/462,955, filed on Mar. 20, 2017, now Pat. No. 10,318,350.

(51) Int. Cl.
*G06F 9/46* (2006.01)
*G06F 9/50* (2006.01)

(52) U.S. Cl.
CPC .......... *G06F 9/5061* (2013.01); *G06F 9/5005* (2013.01); *G06F 9/5077* (2013.01); *G06F 2209/5019* (2013.01)

(58) Field of Classification Search
None
See application file for complete search history.

(56) References Cited

U.S. PATENT DOCUMENTS

2007/0150424 A1   6/2007   Igelnik
2015/0120530 A1   4/2015   Jung et al.
(Continued)

FOREIGN PATENT DOCUMENTS

WO   2007098249   8/2007
WO   2011009101   1/2011
WO   2015134008   11/2015

OTHER PUBLICATIONS

Kryftis, Yiannos, et al. "Efficient entertainment services provision over a novel network architecture." IEEE Wireless Communications 23.1 (2016): 14-21.
(Continued)

*Primary Examiner* — Bing Zhao
(74) *Attorney, Agent, or Firm* — Schmeiser, Olsen & Watts; Maeve M. Carpenter

(57) ABSTRACT

A self-adjusting resource-provisioning system that infers the existence of extrinsic events by monitoring external information sources. When an external source satisfies a threshold condition, the system, as a function of historical records, correlates the inferred event with a likelihood that a Web site or other computerized entity's resource-utilization will reach a certain level at a future time. The system adjusts the available amount of resources to handle the predicted utilization level. If the system fails to accurately predict the actual utilization level, the system adjusts the condition to more accurately predict utilization in the future. If no threshold condition predicts an unexpected change in resource utilization, the system adjusts parameters of an existing condition or creates a new condition to better correlate utilization with future extrinsic events. Every time another condition is satisfied or another unexpected utilization level is detected, the system continues to self-adjust in this manner.

17 Claims, 2 Drawing Sheets

(56) References Cited

U.S. PATENT DOCUMENTS

| | | |
|---|---|---|
| 2015/0248462 A1 | 9/2015 | Theeten et al. |
| 2016/0154676 A1 | 6/2016 | Wen et al. |
| 2016/0171063 A1 | 6/2016 | Kiciman et al. |
| 2016/0179499 A1 | 6/2016 | Reeves et al. |
| 2017/0004404 A1 | 1/2017 | Fujimura et al. |
| 2018/0246746 A1 | 8/2018 | Miller et al. |
| 2018/0267832 A1 | 9/2018 | Biener et al. |

OTHER PUBLICATIONS

Notice of Allowance (dated Jan. 28, 2019) for U.S. Appl. No. 15/462,955, filed Mar. 20, 2017.

SELF-ADJUSTING RESOURCE PROVISIONING IN A MANAGED INFORMATION-TECHNOLOGY ENVIRONMENT

This application is a Continuation application claiming priority to Ser. No. 15/462,955, filed Mar. 20, 2017, now U.S. Pat. No. 10,318,350 issued Jun. 11, 2019.

BACKGROUND

The present invention relates to resource planning in a computerized environment and specifically to using inferential and artificially intelligent methodologies to predict and identify extrinsic events that will require provisioning of additional resources.

Determining how to allocate resources in infrastructure-managed environments (such as provisioning a virtual machine in a cloud-computing environment or redirecting storage or processing power to a particular node of an enterprise network) is typically performed as a function of expected utilization. For example, if it is known that a video-streaming service requires more bandwidth on weekends, a greater number of network resources may be allocated during those peak times.

It is not as easy, however, to predict less-obvious effects of irregular, extrinsic, or environmental factors, such as a catastrophic weather event, political news, sporting events, product announcements, or financial news. For example, a long-term outage at a power plant may greatly increase traffic at Web sites of hardware stores across the region or an announcement of a new single by a popular artist may increase the popularity of that artist's Facebook page, Twitter feed, eBay store, or personal Web site.

Current forecasting and allocation methods are especially challenged when resource demand is driven by an interaction among multiple factors. If, for example, i) a national holiday falls on an upcoming weekend; ii) a blizzard is expected to snarl automobile traffic in a local region during that weekend; and iii) a major train route runs through that region, then there might be a likelihood that traffic on the train carrier's ticketing Web site will increase during the week preceding the holiday. A failure to consider all these factors might result in a failure to add additional trains in time to handle the increased workload and sold-out reservations.

There is thus a need to identify, correlate, and predict the effect of extrinsic or environmental events upon utilization of computerized resources, and to do so early enough to enable the provisioning of additional required resources.

BRIEF SUMMARY

An embodiment of the present invention provides a resource-provisioning system comprising a processor, a memory coupled to the processor, and a computer-readable hardware storage device coupled to the processor, the storage device containing program code configured to be run by the processor via the memory to implement a method for self-adjusting environmentally aware resource provisioning, the method comprising:

monitoring a set of external information sources;

inferring, as a function of the monitoring, that a threshold condition of a set of conditions has been satisfied, where the satisfaction of the threshold condition predicts a computerized entity's expected level of utilization of a first resource at a future time;

reprovisioning the first resource, in response to the inferring, where the reprovisioning changes an amount of the first resource that will be available to the computerized entity at the future time;

determining, at a time later than the future time, whether the total amount of the first resource after the reprovisioning was sufficient to meet requirements resulting from an actual level of utilization of the first resource at the future time;

further determining, at a time later than the future time, whether the total amount of the first resource after the reprovisioning was greater than an amount needed to meet requirements resulting from the actual level of utilization of the first resource at the future time; and adjusting a setting of the threshold condition as a function of the determining and of the further determining, such that the satisfaction of the adjusted threshold condition would have been more likely to have predicted the actual level of utilization at the future time.

Another embodiment of the present invention provides method for self-adjusting environmentally aware resource provisioning, the method comprising:

a processor of a resource-provisioning system monitoring a set of external information sources;

the processor inferring, as a function of the monitoring, that a threshold condition of a set of conditions has been satisfied, where the satisfaction of the threshold condition predicts a computerized entity's expected level of utilization of a first resource at a future time;

the processor reprovisioning the first resource, in response to the inferring, where the reprovisioning changes an amount of the first resource that will be available to the computerized entity at the future time;

the processor determining, at a time later than the future time, whether the total amount of the first resource after the reprovisioning was sufficient to meet requirements resulting from an actual level of utilization of the first resource at the future time;

the processor further determining, at a time later than the future time, whether the total amount of the first resource after the reprovisioning was greater than an amount needed to meet requirements resulting from the actual level of utilization of the first resource at the future time; and the processor adjusting a setting of the threshold condition as a function of the determining and of the further determining, such that the satisfaction of the adjusted threshold condition would have been more likely to have predicted the actual level of utilization at the future time.

Yet another embodiment of the present invention provides a computer program product, comprising a computer-readable hardware storage device having a computer-readable program code stored therein, the program code configured to be executed by a resource-provisioning system comprising a processor, a memory coupled to the processor, and a computer-readable hardware storage device coupled to the processor, the storage device containing program code configured to be run by the processor via the memory to implement a method for self-adjusting environmentally aware resource provisioning, the method comprising:

the processor monitoring a set of external information sources;

the processor inferring, as a function of the monitoring, that a threshold condition of a set of conditions has been satisfied, where the satisfaction of the threshold condition predicts a computerized entity's expected level of utilization of a first resource at a future time;

the processor reprovisioning the first resource, in response to the inferring, where the reprovisioning changes an amount of the first resource that will be available to the computerized entity at the future time;

the processor determining, at a time later than the future time, whether the total amount of the first resource after the reprovisioning was sufficient to meet requirements resulting from an actual level of utilization of the first resource at the future time;

the processor further determining, at a time later than the future time, whether the total amount of the first resource after the reprovisioning was greater than an amount needed to meet requirements resulting from the actual level of utilization of the first resource at the future time, and the processor adjusting a setting of the threshold condition as a function of the determining and of the further determining, such that the satisfaction of the adjusted threshold condition would have been more likely to have predicted the actual level of utilization at the future time.

DETAILED DESCRIPTION

Figure 1:
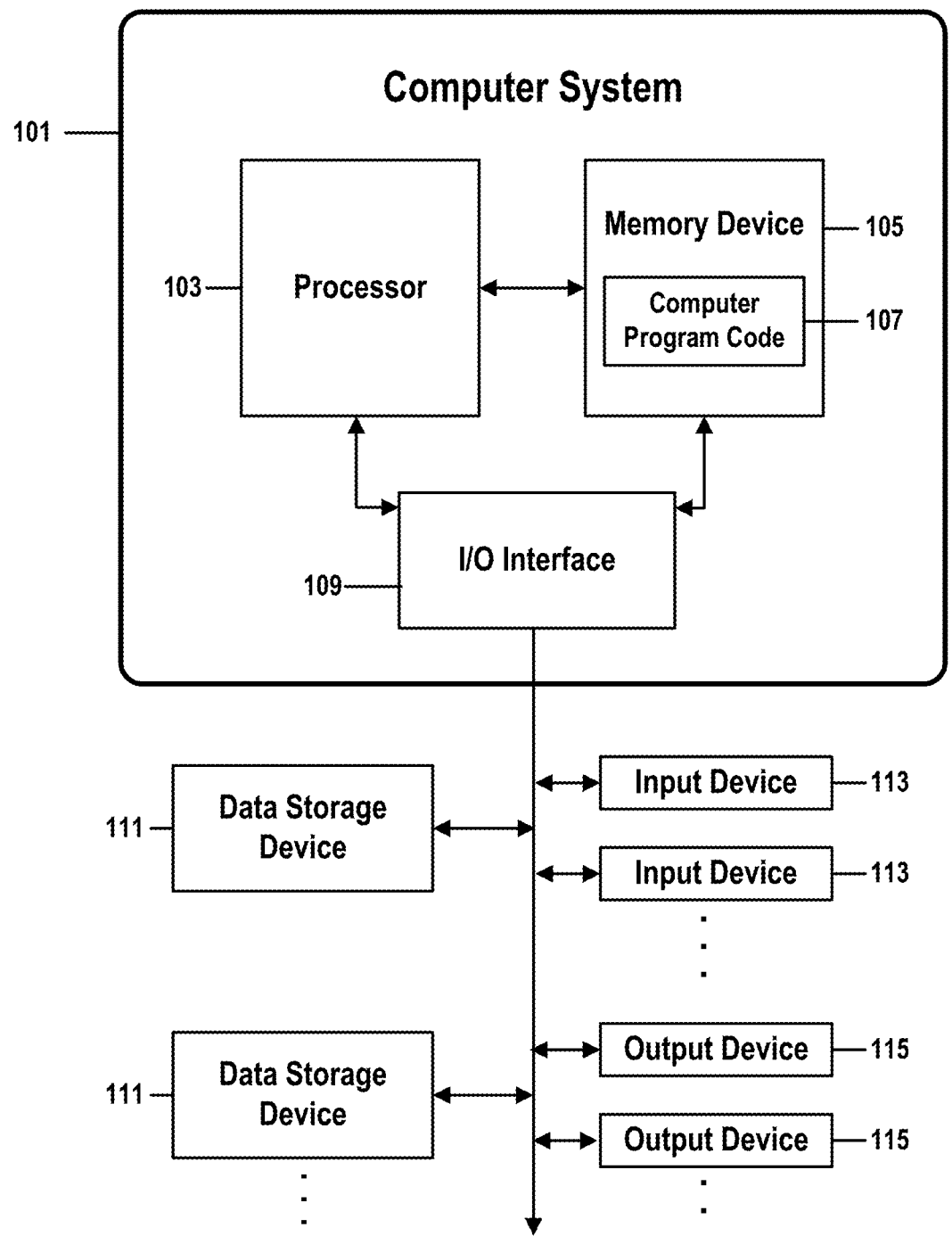
FIG. 1 shows the structure of a computer system and computer program code that may be used to implement a method for self-adjusting environmentally aware resource provisioning in accordance with embodiments of the present invention.

Embodiments of the present invention identify extrinsic events by detecting anomalous behavior on external electronic information sources, such as news and weather feeds, social-media services, governmental announcements, business and entertainment Web sites, and online press releases. These information sources may be analyzed by means known in the art related to artificial intelligence or inferential analysis, such as text analytics, semantic analytics, sentiment analysis, and other types of artificially intelligent applications. The sources may also be analyzed by less-advanced analytical methods, such as keyword-counting or traditional statistical analysis.

The results of these analyses identify and characterize behaviors that have in the past resulted in increased utilization of certain resources. In some cases, the anomalous behavior, such as increased linking to a company's Web sites, may itself be considered an extrinsic event. This is especially true in embodiments that have developed strong correlations between the anomalous behavior and subsequent levels of resource consumption. But in other cases, anomalous behavior may be considered a proxy for an actual real-world event, such as a movie release, a high-profile trial, or a national holiday.

For example, a politician's candidacy announcement might produce a spike in references to that candidate's name in content published by major news services. The present invention might respond by correlating past such spikes with increased volume at the candidate's public Web site.

In another embodiment, the present invention might instead respond by correlating other candidates' previous similar announcements with similar spikes on those candidates' respective Web sites. Such a correlation would help the embodiment draw broader inferences, based on a greater number of observations of subsequent utilization changes that comprise a greater number of variables.

In either example, the embodiment would forecast utilization requirements for the candidate's Web site as a function of how either the previous anomalous behavior or the similar announcements produced increased resource utilization. Here, the system might predict that traffic to the politician's Web site will steadily increase through the next Election Day, and might then respond by provisioning additional resources during that time.

Embodiments of the present invention might further define a threshold condition for each information source and type of event, such as a threshold value, a range, or a score for each type of prediction. In such embodiments, a satisfaction of such a condition might indicate an existence of anomalous behavior or of an extrinsic event of interest.

In one example, predictions of a New England snowstorm have in the past correlated with increased usage of a weather service's smartphone apps in New Hampshire. Forecasts that predict accumulations over 3 inches correlate with at least 30% increased network utilization, and accumulations over 12 inches correlate with a 100% increase in utilization. Furthermore, when storms occur between the months of April and November, bandwidth requirements in the past have increased by an additional 50%. From this information, it is possible to identify a threshold condition or a set of ranges that help predict the apps' bandwidth requirements during the next heavy storm.

Embodiments of the present invention, when detecting an extrinsic event or anomalous behavior known to correlate with increased utilization of a monitored resource, can respond by automatically directing a system-management utility to provision additional resources that in the past would have been sufficient to handle a likely workload increase.

After an embodiment responds to the event by adjusting resource capacity, the embodiment may determine whether a resulting adjustment was sufficient to handle an increased workload triggered by the event, and whether the adjustment did not provision more resources than were needed. If the adjustment erred in either direction, the system may automatically adjust the threshold condition or the degree of resource adjustment in order to more efficiently and effectively respond to future occurrences of similar events. In some cases, the embodiment may also respond to possible errors in its resource reprovisioning by revisiting the embodiment's prior analysis to determine whether a previously undetected cofactor should have been considered.

Similarly, if an unexpected utilization spike in a monitored resource occurs, an embodiment of the present invention may try to determine why that spike was not predicted. If the resource had already been correlated with one or more threshold conditions, the system determines whether the threshold conditions should be made more or less sensitive to certain types of extrinsic events. If the resource is not already correlated with a threshold condition, the system may attempt to identify extrinsic events capable of being related to the spike.

In this manner, embodiments of the present invention combine traditional monitoring of resource utilizations and resource capacities with a novel method of monitoring and analyzing extrinsic events. These embodiments respond to monitored anomalies by adjusting an amount of available resources and by using an iterative feedback mechanism to automatically self-adjust the embodiments' internal analytic rules.

Unlike traditional resource-predicting technologies, embodiments of the present invention do not rely solely on analyses of local resource usage and expected workloads to predict future resource requirements. Embodiments instead incorporate local resource usage into an iterative feedback loop that allows each embodiment to fine-tune its decision-making process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 shows a structure of a computer system and computer program code that may be used to implement a method for self-adjusting environmentally aware resource provisioning in accordance with embodiments of the present invention. FIG. 1 refers to objects 101-115.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM). Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for self-adjusting environmentally aware resource provisioning in accordance with embodiments of the present invention, and may implement other embodiments described in this specification, including the methods illustrated in FIG. 2. The data storage devices 111 may store the computer program code 107. Computer program code 107 stored in the storage devices 111 is configured to be executed by processor 103 via the memory devices 105. Processor 103 executes the stored computer program code 107.

In some embodiments, rather than being stored and accessed from a hard drive, optical disc or other writeable, rewriteable, or removable hardware data-storage device 111, stored computer program code 107 may be stored on a static, nonremovable, read-only storage medium such as a Read-Only Memory (ROM) device 105, or may be accessed by processor 103 directly from such a static, nonremovable, read-only medium 105. Similarly, in some embodiments, stored computer program code 107 may be stored as computer-readable firmware 105, or may be accessed by processor 103 directly from such firmware 105, rather than from a more dynamic or removable hardware data-storage device 111, such as a hard drive or optical disc.

Thus the present invention discloses a process for supporting computer infrastructure, integrating, hosting, maintaining, and deploying computer-readable code into the computer system 101, wherein the code in combination with the computer system 101 is capable of performing a method for self-adjusting environmentally aware resource provisioning.

Any of the components of the present invention could be created, integrated, hosted, maintained, deployed, managed, serviced, supported, etc. by a service provider who offers to facilitate a method for self-adjusting environmentally aware resource provisioning. Thus the present invention discloses a process for deploying or integrating computing infrastructure, comprising integrating computer-readable code into the computer system 101, wherein the code in combination with the computer system 101 is capable of performing a method for self-adjusting environmentally aware resource provisioning.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise the computer-readable hardware storage device.

While it is understood that program code 107 for a method for self-adjusting environmentally aware resource provisioning may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for a method for self-adjusting environmentally aware resource provisioning is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

Figure 2:
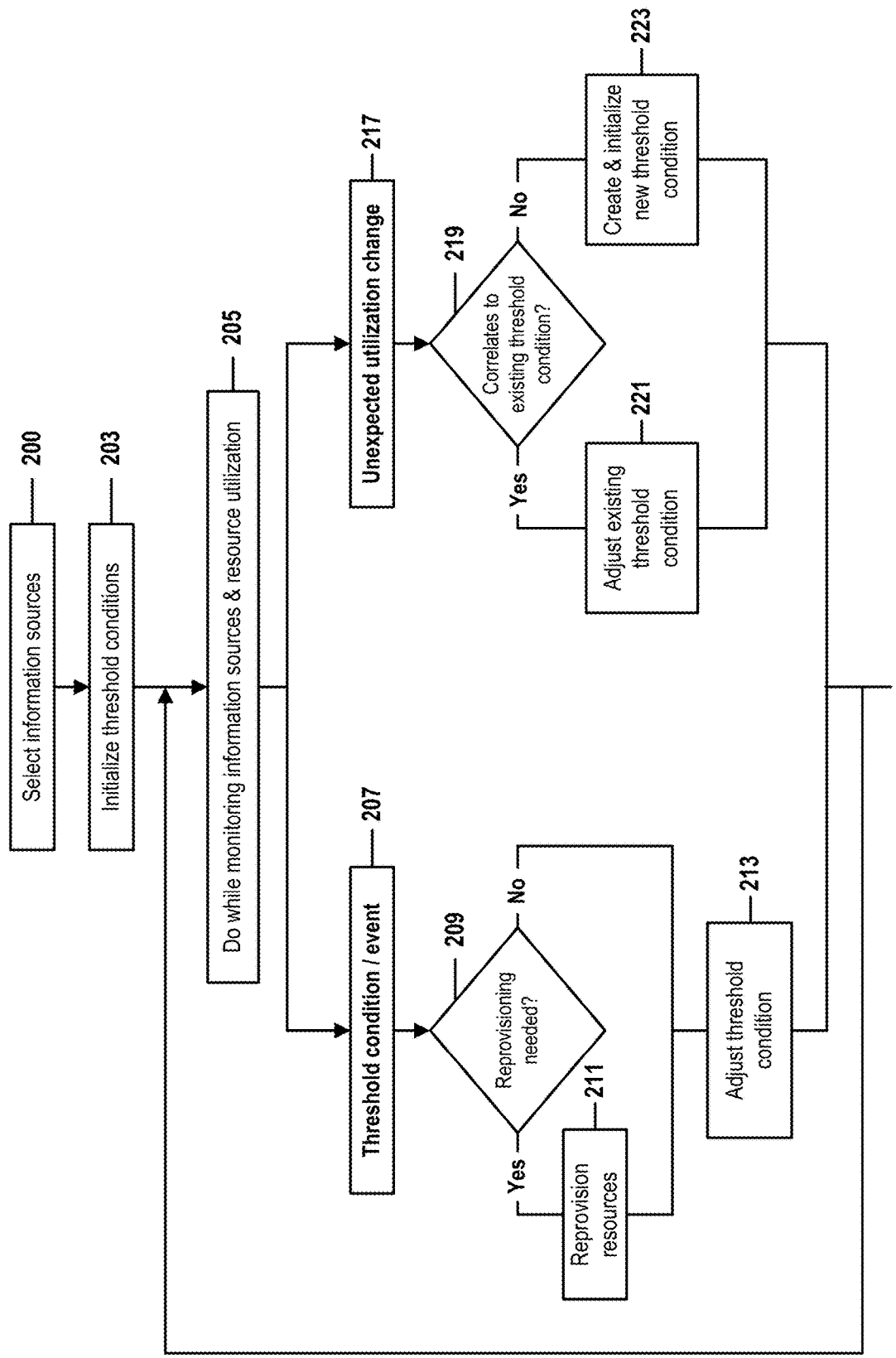
FIG. 2 is a flow chart that shows steps of a method for self-adjusting environmentally aware resource provisioning in accordance with embodiments of the present invention.

FIG. 2 is a flow chart that shows steps of a method for self-adjusting environmentally aware resource provisioning in accordance with embodiments of the present invention. FIG. 2 shows elements identified by reference numbers 200-223. The steps of the method of FIG. 2 may be performed by a resource-provisioning system that automatically provisions resources used by a computerized entity. Examples of such computerized entities may comprise a Web site, a streaming-video or streaming-audio service, a cloud-computing platform or other type of virtualized computing environment, a telecommunications platform, or a physical computing infrastructure. Examples of such provisioned resources include network bandwidth, software applications, management tools, and physical or virtual infrastructure components like servers, user workstations, LANs, storage media, processors, network interfaces, and computer memory.

In step 200, the resource-provisioning system selects a set of information sources to monitor. As described above, these sources may comprise any sort of computerized, online, electronic, or electronically distributed sources known in the art. Sources may, for example, include electronic weather-service and news feeds, social-media services, governmental announcements, government agency sites, mainstream-media outlets, business and entertainment Web sites, online publications or periodicals, and press-release services.

This selection may be performed by any automated or non-automated means known in the art. For example, a person with expert knowledge of a field or industry associated with the computerized entity may program the system to select sources that are generally known to correlate well with interests associated with the computerized entity. For example, a movie studio wishing to predict utilization of the Web sites it dedicates to upcoming film releases may choose to monitor electronic entertainment-news feeds, electronic magazines that publish movie reviews, and high-profile, film-related users of general-interest social-media services.

Alternatively, selection may also be made by means of automated methods known in the art. For example, an embodiment developed for the previously mentioned movie studio might select all periodicals currently associated with an industry code specific to the movie industry. Another embodiment may automatically select and deselect feeds depending on whether the feeds are currently tagged with, or comprise, certain keywords, metadata, or hashtags deemed relevant to a goal of the embodiment.

Embodiments of the present invention are flexible enough to accommodate any combination of manual and automated selection methods that may be desired by an implementer.

Regardless of the method of selection, the system in this step should select sources that are likely to correlate with factors that affect utilization of the computerized entity. It is not essential, however, that this initial selection step accurately select an optimal set of sources. The iterative, self-adjusting nature of the present invention allows it to automatically de-emphasize or drop information sources that do not in practice correlate with utilization-sensitive factors.

In step 203, the resource-provisioning system selects and initializes a set of threshold conditions. Each information source selected in step 200 may be associated with one or more of these threshold conditions.

A selected threshold condition may be satisfied or triggered by an observation of anomalous behavior of associated information sources. For example, the aforementioned exemplary movie studio may monitor, on a social-media service, tweets, trending hashtags, retweets, and "follow" designations that incorporate or mention all or part of a title of a particular movie. Here, a threshold condition may be created that is satisfied when more than 1000 such mentions appear during the course of a single day.

A threshold condition may be as simple as a determination of whether a counted parameter (such as a number of Facebook postings that comprise a certain keyword, hashtag, or embedded link) exceeds a numeric value, or may be more complex, incorporating weightings or correlating multiple utilization projections or recommended courses of action with corresponding ranges of values. In some embodiments, a condition may comprise a combination of several other conditions, such as in the previous snowstorm/holiday/accumulation example.

Embodiments of the present invention are flexible enough to accommodate any known method of selecting threshold conditions that may be desired by an implementer. For example, the exemplary movie studio may, based on past experience, be interested in a level of interest in one of its films that is indicated by at least 20 daily references to the film title published in industry-wide news feeds. In automated systems, the resource-provisioning system may automatically adopt a threshold condition that is known to have provided useful results to resource-provisioning efforts used in conjunction with previous releases.

In one example, a compliant resource-provisioning system attempts to ensure that resources of a Web site www-.RealityShow.com are provisioned to efficiently handle future demands by viewers of a television series "Reality Show." A first threshold condition states that, if #realityshow becomes one of Twitter's Top 10 feeds in at least five major cities, then an expected value of www.RealityShow.com's physical-storage utilization will rise by 40% and an expected value of www.RealityShow.com's virtual-storage utilization will rise by 30%. A second threshold condition states that if a trailer for "Reality Show" is selected to be a YouTube lead video, then an expected value of www.RealityShow's video-bandwidth resource utilization will rise by 12%. A third threshold condition states that, if sentiment analyses and passion scores (derived by means known in the art) of Facebook postings that contain the case-sensitive phrase "Reality Show" both rise monotonically for at least 24 hours, then clickthroughs of a www.RealityShow.com link to a Reality Show merchandise e-commerce site will rise to at least 50% of their average expected value.

In some embodiments, it may not be important to select and initialize a threshold condition in an optimal manner because the system will iteratively self-adjust previously set threshold condition by means of the iterative procedure of step 207-223. Good results, therefore, may be obtained through even an arbitrary selection of threshold conditions. Selection may thus be performed even by means of default, null, or average values programmed into an automated software module, or by means of a random assignments or guesses made by a human programmer or user.

In step 205, once information sources have been selected and threshold conditions have been selected and initialized, the resource-provisioning system begins an iterative procedure of steps 205-223. The system may continue this procedure indefinitely.

In each iteration of this procedure, the system: i) checks the status of, or analyzes recently logged statistics associated with, the monitored information sources; and ii) measures the utilization of monitored resources of the computerized entity. If the system detects anomalous behavior of a monitored source, the system responds by performing steps 207-213. If the system detects an unacceptable degree of resource utilization that was not predicted by the satisfaction of a threshold condition, the system performs steps 217-223. At the conclusion of either path, the system returns to step 205 to begin the next iteration of the iterative procedure.

The frequency with which the iterative procedure of steps 205-223 is repeated may be implementation-dependent. If, for example, an embodiment selects a prominent Twitter feed as an information source and selects a threshold condition that is satisfied when that feed mentions each of three keywords on average 400 times per hour, then it might make sense for the iterative procedure to be repeated hourly. If an embodiment monitors weather services that are updated every half-hour, then the iterative procedure might also be performed every thirty minutes in order to avoid missing updates. In this latter example, the timing of each iteration of the iterative procedure might be further adjusted such that each iteration is performed one minute after each expected update.

The frequency of the iterative procedure may, in some embodiments, be constrained by technical constraints. If, for example, sampling an information source every 30 seconds would create a workflow bottleneck, the system might instead be configured to sample the source at the greatest frequency that does not produce an unacceptable degradation of response time. That greatest frequency might need to be selected empirically, by gradually increasing iteration frequency until adverse results occur.

In step 207, the system, using rules, weightings, or tests implicit to the definitions of the threshold conditions, determines that a previously defined threshold condition has occurred. This threshold condition may comprise anomalous behavior of a monitored information source. For example, in an embodiment that provisions resources for a musician's Web site, a threshold condition may occur if more than 75 Facebook references to the musician's new recording appear hourly during the course of an entire day. In another embodiment, where the embodiment is intended to ensure efficient operation of a Web site dedicated to an upcoming awards show broadcast, a threshold condition may specify that the Web site's memory, cloud storage, and network bandwidth should be increased by 35% when a hashtag "#awards show" trends into a Top 10 list in at least eight major U.S. cities.

The system may also determine that a threshold condition has been satisfied if that threshold condition has been selected to be an extrinsic event. In the previous snowstorm example, rather than monitor information sources for anomalous levels of activity, the system might instead monitor a weather service, determining that snow accumulation has reached a certain threshold level through simple a simple keyword search. In such embodiments, the system determines directly that an extrinsic event has actually occurred, rather than inferring the occurrence of the event by monitoring proxy determinants like news stories or user postings that may correlate with the extrinsic event.

In step 209, the system, using the threshold condition rules, weightings, scores, or tests, determines whether the system should respond to the previous identification of a threshold condition (either an external event or anomalous behavior of an information source) by provisioning additional resources or deprovisioning excess resources. If the system determines that resources should be provisioned or deprovisioned, the method of FIG. 2 performs step 211. If the system determines that no resources should be provisioned or deprovisioned, the method of FIG. 2 skips step 211 and continues with step 213.

This determination may be performed by comparing amounts of currently provisioned resources with the amount of resources that will need to be provisioned in order to effectively handle utilization levels associated with the occurrence of the condition.

If, for example, a Web site's currently provisioned resources are sufficient to handle utilization that is 40%, above average, no reprovisioning would be necessary if the occurring condition is associated with an imminent spike in utilization that is 40% above average. In such a case, the system in step 209 would determine that no reprovisioning is necessary and the method of FIG. 2 would proceed directly to step 213.

If, however, the Web site's currently provisioned resources are capable of handling only an average level of resource utilization, the system would perform step 211 in order to provision additional resources. Similarly, if the Web site's currently provisioned resources are capable of handling utilization that is 70% greater than average, the system would again perform step 211 in order to deprovision the extra, unneeded resources.

In either case, if a utilization level is forecast to occur at a future time, the system might not immediately provision or deprovision resources in order to accommodate the forecasted utilization change. This might occur if another iteration of the iterative procedure of steps 205-223 is expected to be performed before the forecasted utilization change is expected to affect the Web site. In other cases, the resource-provisioning system might schedule a resource-reprovisioning task to be performed at a future time prior to the time of the expected utilization change.

Step 211 is performed if the system in step 209 determines that one or more resources associated with the computerized entity must be reprovisioned in order to most effectively and efficiently respond to a change in the entity's resource utilization predicted by the occurrence of the threshold condition.

For example, the system may have in step 207 identified an occurrence of a first threshold condition, indicating that a Web site's utilization of its virtual-storage resource is about to spike to a level that is 30% greater than average. The system might then respond in step 211 by provisioning additional virtualized storage infrastructure sufficient to meet the demands of the utilization spike.

However, if a second threshold condition is instead identified in step 207, the satisfaction of that condition may predict that the Web site's network-bandwidth utilization is about to drop to less than 75% of average. The system would then respond in step 211 to the satisfaction of this second condition by deprovisioning some of the site's unneeded network infrastructure.

If the system in step 207 determines that a threshold condition has been satisfied and that this satisfaction indicates a likelihood that expected levels of utilization can be served efficiently by currently allocated resources, then the system does not perform step 211 and does not provision or deprovision any resources.

This provisioning or deprovisioning may be performed by any means known in the art. For example, the resource-provisioning system may interface with a network-management console, a cloud-management stack, or a system-maintenance utility. In such cases, the resource-provisioning system may direct one of these tools or utilities to directly provision or deprovision resources. Other embodiments, especially those that are tightly coupled to a particular monitored computer entity and associated resources, might themselves have the ability to provision or deprovision certain resources, rather than requesting a reprovisioning task from a third-party module. In some embodiments, the resource-provisioning system may request that a human user or administrator perform or authorize a reprovisioning task.

In step 213, the system performs a self-adjustment procedure that adjusts one or more threshold conditions. Because the present invention is a self-learning, self-adjusting program based on an iterative feedback loop (steps 205-223), each iteration of the loop provides an opportunity to refine parameters like a choice of information sources, choice of threshold conditions, settings and values associated with selected threshold conditions, and probabilities that utilization forecasts will be accurate.

In some embodiments, this self-adjustment will not be performed until enough time has passed to allow the system to determine whether the utilization change predicted by the occurrence of the threshold condition indeed occurred as predicted. This delay may allow the system to determine how accurately the currently defined threshold condition is able to forecast future utilization levels.

In other embodiments, step 213 may be instead performed between steps 207 and 209, in order to ensure that steps 209 and 211 are performed only after relevant threshold conditions have been adjusted to account for the most recent feedback. Such feedback may, for example, update the accuracy of the threshold condition's previous utilization forecasts, or may update the correlation strength between the condition and the level or timing of utilization changes associated with occurrence of the condition.

The self-adjustment may be performed by any method known in the art and, in some embodiments, may be performed by straightforward, automated applications of common statistical functions. In other embodiments, self-adjustment may incorporate more sophisticated techniques of machine learning or artificial analysis, such as sentiment analysis, semantic analytics, text analytics, or methods of inferential logic. The present invention is flexible enough to accommodate any sort of self-adjusting technique or methodology desired by an implementer.

In some embodiments, step 213 may perform an adjustment procedure even if the satisfaction of a threshold condition, determined in step 207, produced accurate, expected results. In certain embodiments, step 213 may perform no adjustments to parameters of the resource-provisioning system if considering the most recent feedback data does not significantly alter any of the parameters. In such a case, the parameters may be considered to have converged, at least for the present, to an optimal value. The system may at that stage suspend performance of step 213 for at least a predetermined period of time.

In one example, a threshold condition may identify three value ranges of tracked indicators (such as a count of relevant Twitter retweets, media references, or Facebook postings), where each range forecasts a distinct expected value of a number of app downloads requested from a particular Web site. If the indicator falls into a low range, the system may adjust Web-site resources downward, such as by deprovisioning virtual infrastructure. If the indicator falls into a moderate range, the system may allow resources to remain at their current levels. If the indicator falls into a high range, the system may adjust Web-site resources upward.

In some embodiments, adjustments may be a function of more than one threshold condition, or may be a function of one or more threshold conditions and a current level of availability of certain resources. In the previous example, a second threshold condition may be added to account for current levels of resource allocation. When combined with the previous threshold condition, the resulting rules may state that, if a high level of resources is currently provisioned, the system may respond to a determination that the indicator falls into either the low or moderate range by deprovisioning resources and may respond to a determination that the indicator falls into the high range by allowing resources to remain at their current high level.

Finally, these two threshold conditions may be augmented by a third threshold condition that states that, if provisioning the maximum possible amount of resources is still insufficient to satisfy expected utilization, that the system must request additional resources from another platform not normally within the scope of the system.

Examples of self-adjustment methodologies are described below. At the conclusion of step 213, the method of FIG. 2 returns to step 205, initiating the next iteration of the iterative procedure of steps 205-223.

In step 217, the system determines that utilization of a monitored resource has changed significantly, but has not detected that a corresponding threshold condition has been satisfied in a manner that would have predicted the utilization change. The method of FIG. 2 then performs steps 219-223, after which it returns to step 205, in order to initiate the next iteration of the iterative procedure of steps 205-223.

In step 219, the resource-provisioning system attempts to identify an existing threshold condition that might be capable of being correlated with the unexpected utilization change. One example of such a correlation might be a correlation between a level of user activity on a popular online comic-book social-media service (a threshold condition) and a forecasted level of network-bandwidth utilization on a Web site dedicated to an upcoming comic-book convention (a forecasted resource-utilization level on a computerized entity).

Even if the social-media user activity is not high enough to trigger a threshold condition that predicts the utilization level identified in step 217, the system might still identify the threshold condition as being at least nominally correlated to the Web site's levels of bandwidth utilization. This identification might be made by a method as simple as observing that the threshold condition is the only existing condition that attempts to predict changes in the site's bandwidth utilization.

In step 221, regardless of the method of identifying a correlatable threshold condition, the system may adjust the threshold condition to more accurately account for the unpredicted utilization change.

Step 221 is performed if the system in step 219 is able to, by any means described above, correlate the unexpected utilization level identified in step 217 with one or more existing threshold conditions. The system might accomplish this by adjusting a parameter of an existing threshold condition or by adjusting an expected value of resource utilization to better match the unexpected utilization level detected in step 217. An example of such an adjustment is described below.

Step 223 is instead performed if the system in step 219 is unable to correlate the unexpected utilization level identified in step 217 with an existing threshold condition. In this case, the system, or a user or administrator of the system, attempts to identify and initialize one or more threshold condition that might more accurately predict utilization of the resource in question.

This new threshold may be identified by any means known in the art, by either manual or automated procedures, including those discussed in the description of step 203.

At the conclusion of step 221 or 223, the current iteration of the iterative procedure of steps 205-223 concludes, and the method of FIG. 2 continues with step 205 in order to begin the next iteration. Each iteration of this iterative procedure will continue to self-adjust the way that the system responds to occurrences of threshold conditions or detections of unexpected utilization levels, such that the system will over time automatically fine-tune itself to optimally provision resources for the monitored entity.

There are many known ways to relate threshold conditions to expected values of a computerized entity's resource utilization and to automatically adjust those conditions and expected values to better match real-world observations.

In one example, rules embedded into a threshold condition may identify probabilities that each of a set of expected utilization values will occur in response to an extrinsic event. For example, a threshold condition may identify that an event has occurred if a streaming-media service's announcement of popular new content generates a certain measurable level of viewer enthusiasm. If such an event occurs, rules embedded in the condition will assign a corresponding probability to each range of the service's streaming-server utilization figures that is capable of occurring in response to the event. As described in FIG. 2, these probabilities may be self-adjusted over time as the system continues to cycle through iterations of the iterative procedure of step 205-223.

In this example, the threshold condition identifies eleven evenly divided ranges of expected values of server utilization that may be expected in response to an occurrence of the monitored event:

|  | Utilization Expected Values | | | | | | | | | | |
| --- | --- | --- | --- | --- | --- | --- | --- | --- | --- | --- | --- |
|  | 0 | 10 | 20 | 30 | 40 | 50 | 60 | 70 | 80 | 90 | 100 |
| Iteration 0 Probability | 9.1% | 9.1% | 9.1% | 9.1% | 9.1% | 9.1% | 9.1% | 9.1% | 9.1% | 9.1% | 9.1% |

Here, each of the eleven ranges of expected values is arbitrarily assigned an equal initial value of 9.1%, or a chance of 1 in 11 of occurring. That is, if user enthusiasm is sufficient to qualify as a monitored event occurrence, there are equal 9.1% probabilities that server utilization will decrease to a value within any of eleven possible ranges. The first numeric column specifies a 9.1% probability that utilization will fall into the range of 0-10 units, the second numeric column specifies a 9.1% probability that utilization will fall into the range of 10-20 units, and so forth. The rightmost column specifies a 9.1% probability that utilization will fall into the range of at least 100 units. In other examples, these expected values may be expressed as percent increases or decreases respective to current utilization levels, percent increases or decreases respective to average utilization levels, or any other type of representation known in the art.

When the monitored event occurs the first time, with utilization currently at a value of 70 units, "iteration 0" of the iterative procedure of steps 205-223 does not reprovision resources because there is as yet no historical record of how occurrence of the monitored event may affect future utilization.

After the first occurrence of the monitored event, the resource-provisioning system determines in step 217 that utilization spiked to a value of 134.904 units, placing it in the range of the rightmost column. This results in the system self-adjusting the utilization expected-value probabilities to represent the historical record. That is, "iteration 1" probabilities now show a 100% chance that an occurrence of the event will produce server utilization exceeding 100 units.

|  | Utilization Expected Values | | | | | | | | | | |
| --- | --- | --- | --- | --- | --- | --- | --- | --- | --- | --- | --- |
|  | 0 | 10 | 20 | 30 | 40 | 50 | 60 | 70 | 80 | 90 | 100 |
| Iteration 0 Probability | 9.1% | 9.1% | 9.1% | 9.1% | 9.1% | 9.1% | 9.1% | 9.1% | 9.1% | 9.1% | 9.1% |
| Iteration 1 Probability | 0% | 0% | 0% | 0% | 0% | 0% | 0% | 0% | 50% | 0% | 50% |

The next time the monitored extrinsic event occurs, utilization rises from a baseline value of 134 units to a new value of 85.403 units. This results in the expected-value probabilities self-adjusting to represent that an occurrence of the event has a 50% chance of producing utilization in the 80-90 unit range and a 50% chance of falling in the >100-unit range.

The rules embedded into each threshold condition may continue to adjust these expected-value probabilities with each new occurrence of a monitored extrinsic condition. As the sample size of event occurrences grows larger (and more statistically significant), these probabilities may converge to an optimal value that best represents empirical results and may most accurately select expected values of resource utilization that may occur in response to a particular type of extrinsic event.

In such embodiments, every time that an event occurs, the resource-provisioning system may reprovision, or direct other entities to reprovision resources identified by a corresponding threshold condition as necessary to efficiently handle expected changes in utilization that occur in response to the event.

In the above example, the system might, in subsequent iterations, continue to self-adjust probabilities associated by the threshold condition with each possible range of expected values. These iterative self-adjustments might produce the following sets of expected-value probabilities.

|  | Utilization Expected Values | | | | | | | | | | |
| --- | --- | --- | --- | --- | --- | --- | --- | --- | --- | --- | --- |
|  | 0 | 10 | 20 | 30 | 40 | 50 | 60 | 70 | 80 | 90 | 100 |
| Iteration 0 Probability | 9.1% | 9.1% | 9.1% | 9.1% | 9.1% | 9.1% | 9.1% | 9.1% | 9.1% | 9.1% | 9.1% |
| Iteration 1 Probability | 0% | 0% | 0% | 0% | 0% | 0% | 0% | 0% | 50% | 0% | 50% |
| Iteration 2 Probability | 0% | 0% | 0% | 0% | 0% | 0% | 0% | 0% | 66% | 0% | 33% |
| Iteration 3 Probability | 0% | 0% | 0% | 0% | 25% | 0% | 0% | 0% | 50% | 0% | 25% |
| Iteration 4 Probability | 0% | 0% | 0% | 0% | 50% | 0% | 0% | 0% | 50% | 0% | 25% |

If a third occurrence of the monitored event occurs while the threshold condition identifies the "Iteration 2 Probability" set, then the system will determine that the most likely result of that occurrence will be that utilization will fall into a range of 80-90 units. If resources are currently provisioned to efficiently handle a utilization of 74 units, the system will respond by provisioning additional resources necessary to handle 90 units of utilization. The selection of which resources to provision and of the actual number of units of each resource to provision may be determined by means known in the art or known to those with expert knowledge of the monitored entity and its associated resources. Rules that govern the actual amount of resource adjustment may be incorporated into rules intrinsic to the threshold condition, may be programmed into the resource-provisioning system, or may be intrinsic to utilities or tools that the system directs to perform actual reprovisioning tasks.

Similarly, if a fifth occurrence of the monitored event occurs while the threshold condition identifies the "Iteration 4 Probability" set, then the system will determine that the most likely utilization effect of that occurrence will be that utilization will fall into a range of 40-50 units. If resources are currently provisioned to efficiently handle a utilization of 103 units, the system may respond by deprovisioning resources to a level capable of handling no more than 50 units of utilization.

In some embodiments, these adjustments may occur as a function of a future predicted event, not as a function of an event that has already occurred. For example, if historical records identify utilization changes that have occurred in the past whenever a certain sporting event occurs, resources may be reprovisioned in anticipation of a next time that the sporting event occurs. Such proscriptive embodiments may track proxy indicators of the event, such as online user sentiment, traffic at related Web sites, or numbers of references to event. But those proxy indicators may be identified by a threshold condition as mere co-factors that weight or scale utilization expected values when the actual event occurs.

The time at which resources are reprovisioned may be further determined as a function of historical records. If, for example, past records show that utilization of a particular resource spiked several hours after an increase in a certain type of user posting, then the system might respond to a similar increase by provisioning additional resources two hours after detection of the increase.

Similarly, when an actual time of a future scheduled event is known, the system may select a time to reprovision resources as a function of the timing of utilization changes that occurred in response to prior occurrences of similar events. If, for example, a certain recording artist's previous concert-date announcements each increased CPU utilization at the artist's Web site one week prior to each performance, then, when the system detects that the artist has made a similar announcement, the system may respond by provisioning additional resources one week before the newly announced concert date.

In some embodiments, after performing a reprovisioning task, the resource-management system may determine, or may request a determination from a logging or maintenance component, whether the reprovisioning enabled the computerized entity to handle a workload that the entity would not otherwise have been able to manage. Similarly, the resource-management system may determine, or may request a logging or maintenance component determine, whether the reprovisioning allocated too many resources to the computerized entity, such that at least some of the resources were underutilized.

In some embodiments, the system may determine that two or more extrinsic events may affect expected values of utilization of one or more resources in similar ways, such that the two produce converging utilization expected values. In such a case, an administrator or user may combine two corresponding threshold conditions in a manner that represents a previously identified relationship between the two events. In some embodiments, the resource-provisioning system may perform known statistical analyses on rules embedded into the threshold conditions in order to identify and accommodate such relationships.

Some embodiments of the present invention may incorporate known statistical entities, often referred to as "similarity coefficients," capable of quantizing similarities between data sets. One such coefficient is the Jaccard index, which represents similarity as a non-negative numeric value less than or equal to 1.0. Higher Jaccard index values indicate greater "similarity" between data sets.

Embodiments of the present invention might, for example, use a Jaccard index in step 207 of FIG. 2 to determine whether an event has occurred or whether anomalous behavior of one or more selected information sources has occurred. In one example, a threshold condition may occur if there is a high co-occurrence of two certain categories of keywords on a certain set of information sources. Thus, if a popular feature film comprised a product placement of a certain brand of soft drink, then similarity between Facebook references to the soft drink and Facebook references to the film title might satisfy a threshold condition that seeks to identify user reaction to the product placement. Here, the system might compute a Jaccard index to measure the strength of the similarity and, if the similarity is strong enough, the threshold condition would be deemed to have occurred. In other cases, the system might use a Jaccard-index relative strength of a similarity to select a particular set of expected values generated by a threshold condition in response to a determination that an event has occurred.

Embodiments of the present invention may use the Jaccard index to measure similarity between data sets in other ways. The system may, for example, attempt to identify similarities between data sets monitored by different threshold conditions or to identify similarities between data sets culled from different information sources. These similarities may then be used to streamline operation of the system or to make the system more accurate by allowing the system to merge threshold conditions or to identify previously undetected correlations between distinct information sources.

In all cases, as is known in the art, a Jaccard index may be computed as:

$$J(A, B) = \frac{|A \cap B|}{|A \cup B|}$$

where A and B are data sets being compared, $|A \cap B|$ is the number of elements in the intersection of sets A and B, and $|A \cup B|$ is the number of elements in the union of sets A and B. J(A,B) must thus fall inclusively within the range of 0.0 through 1.0, where a higher value indicates a greater degree of similarity between data sets A and B. Other embodiments may in a similar manner compute other similar, known, similarity coefficients, such as a Sorensen-Dice coefficient or a cosine similarity coefficient.

In one final example of how a Jaccard index may be applied to embodiments of the present invention, consider an embodiment in which A and B are each sets of data items. Set A contains items that are associated with a first keyword or other characteristic, such as Facebook pages that contain references to an upcoming electronics trade show. Set B contains items associated with a second keyword or other characteristic that is distinct from the first keyword or characteristic, such as Facebook pages that contain references to a popular electronics manufacturer.

The embodiment of this example may attempt to determine whether A and B are similar and, if so, the embodiment may attempt to equate the two keywords (thus allowing threshold conditions or information feeds to be merged), or may attempt to identify satisfaction of a more complex threshold condition that is satisfied when references to the show and the manufacturer occur with sufficient synchronicity.

In such a case, the numerator of the Jaccard index identifies a number of pages that contain references to both keywords and the denominator of the Jaccard index identifies a number of pages that contain a reference to at least one of the two keywords. The resulting index may then be used to identify a degree of similarity between the two sets of keyword matches.

Many other uses of similarity coefficients may be used to automate decision-making steps of the method of FIG. 2.

What is claimed is:

1. A resource-provisioning system comprising a processor, a memory coupled to the processor, and a computer-readable hardware storage device coupled to the processor, the storage device containing program code configured to be run by the processor via the memory to implement a method for self-adjusting environmentally aware resource provisioning, the method comprising:

monitoring a set of external information sources;

inferring, as a function of the monitoring, that a threshold condition of a set of conditions has been satisfied, where the satisfaction of the threshold condition predicts a computerized entity's expected level of utilization of a first resource at a future time;

reprovisioning the first resource, in response to the inferring, where the reprovisioning changes an amount of the first resource that will be available to the computerized entity at the future time;

determining, at a time later than the future time, whether the total amount of the first resource after the reprovisioning was sufficient to meet requirements resulting from an actual level of utilization of the first resource at the future time;

further determining, at a time later than the future time, whether the total amount of the first resource after the reprovisioning was greater than an amount needed to meet requirements resulting from the actual level of utilization of the first resource at the future time;

adjusting a value of the threshold condition,
where the adjusting selects the adjusted value as a function of the determining and of the further determining, and
where the adjusting increases a correlation between the requirements for satisfaction of the threshold condition and the actual level of utilization at the future time;

detecting an unexpected change in the computerized entity's utilization of a second resource, where the change is deemed to be unexpected because the change was not predicted by a satisfaction of any condition of the set of conditions;

attempting to identify a second condition of the set of conditions that is capable of predicting future levels of utilization of the second resource by the computerized entity;

if successfully identifying the second condition, adjusting a value of the second condition such that satisfaction of the adjusted second condition would have been capable of predicting the unexpected change before the unexpected change occurred; and if unable to identify the second condition, adding a new condition to the set of conditions, such that the new condition would have been capable of predicting the unexpected change before the unexpected change occurred.

2. The system of claim 1, where the satisfaction of the threshold condition indicates a likelihood of an occurrence of an extrinsic event, and where the occurrence of the extrinsic event is capable of being correlated with a likelihood of a change in the computerized entity's expected level of utilization of the first resource at the future time.

3. The system of claim 1, where the satisfaction of the threshold condition occurs when anomalous behavior of at least one of the external information sources directly or indirectly indicates an occurrence of an extrinsic event, and where the occurrence of the extrinsic event is capable of being correlated with a likelihood of a change in the computerized entity's expected level of utilization of the first resource at the future time.

4. The system of claim 3, where the anomalous behavior comprises a certain frequency or a certain absolute number of references to a specific set of keywords.

5. The system of claim 1, where the external information sources are selected from the group consisting of: a social media service; an online business, entertainment, or government information source; an electronic publication; and an electronic news feed.

6. The system of claim 1, where the computerized entity is a virtual component of a cloud-computing platform.

7. The system of claim 1, where the computerized entity is an Internet Web site.

8. A method for self-adjusting environmentally aware resource provisioning, the method comprising:
   a processor of a resource-provisioning system monitoring a set of external information sources;
   the processor inferring, as a function of the monitoring, that a threshold condition of a set of conditions has been satisfied, where the satisfaction of the threshold condition predicts a computerized entity's expected level of utilization of a first resource at a future time;
   the processor reprovisioning the first resource, in response to the inferring, where the reprovisioning changes an amount of the first resource that will be available to the computerized entity at the future time;
   the processor determining, at a time later than the future time, whether the total amount of the first resource after the reprovisioning was sufficient to meet requirements resulting from an actual level of utilization of the first resource at the future time;
   the processor further determining, at a time later than the future time, whether the total amount of the first resource after the reprovisioning was greater than an amount needed to meet requirements resulting from the actual level of utilization of the first resource at the future time;
   the processor adjusting a value of the threshold condition, where the adjusting selects the adjusted value as a function of the determining and of the further determining, and
      where the adjusting increases a correlation between the requirements for satisfaction of the threshold condition and the actual level of utilization at the future time;
   the processor detecting an unexpected change in the computerized entity's utilization of a second resource, where the change is deemed to be unexpected because the change was not predicted by a satisfaction of any condition of the set of conditions;
   the processor attempting to identify a second condition of the set of conditions that is capable of predicting future levels of utilization of the second resource by the computerized entity;
   if successfully identifying the second condition, the processor adjusting a value of the second condition such that satisfaction of the adjusted second condition would have been capable of predicting the unexpected change before the unexpected change occurred; and
   if unable to identify the second condition, the processor adding a new condition to the set of conditions, such that the new condition would have been capable of predicting the unexpected change before the unexpected change occurred.

9. The method of claim 8, where the satisfaction of the threshold condition indicates a likelihood of an occurrence of an extrinsic event, and where the occurrence of the extrinsic event is capable of being correlated with a likelihood of a change in the computerized entity's expected level of utilization of the first resource at the future time.

10. The method of claim 8, where the satisfaction of the threshold condition occurs when anomalous behavior of at least one of the external information sources directly or indirectly indicates an occurrence of an extrinsic event, and where the occurrence of the extrinsic event is capable of being correlated with a likelihood of a change in the computerized entity's expected level of utilization of the first resource at the future time.

11. The method of claim 10, where the anomalous behavior comprises a certain frequency or a certain absolute number of references to a specific set of keywords.

12. The method of claim 8, where the computerized entity is an Internet Web site.

13. The method of claim 8, further comprising providing at least one support service for at least one of creating, integrating, hosting, maintaining, and deploying computer-readable program code in the computer system, wherein the computer-readable program code in combination with the computer system is configured to implement the monitoring, the inferring, the reprovisioning, the determining, the further determining, the adjusting, the detecting, the attempting, the adjusting, and the adding.

14. A computer program product, comprising a computer-readable hardware storage device having a computer-readable program code stored therein, the program code configured to be executed by a resource-provisioning system comprising a processor, a memory coupled to the processor, and a computer-readable hardware storage device coupled to the processor, the storage device containing program code configured to be run by the processor via the memory to implement a method for self-adjusting environmentally aware resource provisioning, the method comprising:
   the processor monitoring a set of external information sources;
   the processor inferring, as a function of the monitoring, that a threshold condition of a set of conditions has been satisfied, where the satisfaction of the threshold condition predicts a computerized entity's expected level of utilization of a first resource at a future time;
   the processor reprovisioning the first resource, in response to the inferring, where the reprovisioning changes an amount of the first resource that will be available to the computerized entity at the future time;
   the processor determining, at a time later than the future time, whether the total amount of the first resource after the reprovisioning was sufficient to meet requirements resulting from an actual level of utilization of the first resource at the future time;
   the processor further determining, at a time later than the future time, whether the total amount of the first resource after the reprovisioning was greater than an amount needed to meet requirements resulting from the actual level of utilization of the first resource at the future time;
   adjusting a value of the threshold condition,
      where the adjusting selects the adjusted value as a function of the determining and of the further determining, and where the adjusting increases a correlation between the requirements for satisfaction of the threshold condition and the actual level of utilization at the future time;

the processor detecting an unexpected change in the computerized entity's utilization of a second resource, where the change is deemed to be unexpected because the change was not predicted by a satisfaction of any condition of the set of conditions;

the processor attempting to identify a second condition of the set of conditions that is capable of predicting future levels of utilization of the second resource by the computerized entity;

if successfully identifying the second condition, the processor adjusting a value of the second condition such that satisfaction of the adjusted second condition would have been capable of predicting the unexpected change before the unexpected change occurred; and if unable to identify the second condition, the processor adding a new condition to the set of conditions, such that the new condition would have been capable of predicting the unexpected change before the unexpected change occurred.

15. The computer program product of claim 14, where the satisfaction of the threshold condition indicates a likelihood of an occurrence of an extrinsic event, and where the occurrence of the extrinsic event is capable of being correlated with a likelihood of a change in the computerized entity's expected level of utilization of the first resource at the future time.

16. The computer program product of claim 14, where the satisfaction of the threshold condition occurs when anomalous behavior of at least one of the external information sources directly or indirectly indicates an occurrence of an extrinsic event, and where the occurrence of the extrinsic event is capable of being correlated with a likelihood of a change in the computerized entity's expected level of utilization of the first resource at the future time.

17. The computer program product of claim 14, where the computerized entity is an Internet Web site.

* * * * *